(12) United States Patent
Windle (10) Patent No.: US 11,208,083 B2
(45) Date of Patent: Dec. 28, 2021

(54) METHOD AND APPARATUS FOR STABILIZING VEHICULAR JACK BASES

(71) Applicant: Bill Windle, Syracuse, IN (US)

(72) Inventor: Bill Windle, Syracuse, IN (US)

( * ) Notice: Subject to any disclaimer, the term of this patent is extended or adjusted under 35 U.S.C. 154(b) by 121 days.

(21) Appl. No.: 16/747,019

(22) Filed: Jan. 20, 2020

(65) Prior Publication Data

US 2021/0078547 A1 Mar. 18, 2021

Related U.S. Application Data

(63) Continuation-in-part of application No. 16/571,653, filed on Sep. 16, 2019.

(51) Int. Cl.
*B60S 9/02* (2006.01)
*F21K 2/00* (2006.01)

(52) U.S. Cl.
CPC . *B60S 9/02* (2013.01); *F21K 2/00* (2013.01)

(58) Field of Classification Search
CPC ................................ B60S 9/02; F21K 2/00
USPC ...................................................... 280/763.1
See application file for complete search history.

(56) References Cited

U.S. PATENT DOCUMENTS

| 10,960,856 B1 * | 3/2021 | Weddle ................... B66F 3/44 |
| 2020/0269641 A1 * | 8/2020 | Edwards, Sr. .......... B66F 7/246 |

* cited by examiner

*Primary Examiner* — Christopher M Raabe
(74) *Attorney, Agent, or Firm* — C. John Brannon; Brannon Sowers & Cracraft PC (57) ABSTRACT

A method for locating an RV in the dark, including extending at least one stabilizing jacks from an RV toward soft ground, engaging at least one phosphorescent jack pad between the at least one jack and the ground, charging the at least one phosphorescent jack pad with daylight, and locating the RV in the dark from the glow of the at least one phosphorescent jack pad.

11 Claims, 9 Drawing Sheets

METHOD AND APPARATUS FOR STABILIZING VEHICULAR JACK BASES

CROSS-REFERENCE TO RELATED APPLICATIONS

This patent application is a continuation-in-part of, and claims priority to, co-pending U.S. patent application Ser. No. 16/571,653, filed on Sep. 16, 2019.

TECHNICAL FIELD

This specification relates generally to the field of mechanical engineering and, more specifically, to base pads for recreational vehicle stabilizing jacks that leave animal footprints after use.

BACKGROUND

Recreational vehicles (RVs) are typically motor homes or trailers that feature living quarters affording temporary or permanent accommodation to occupants. RVs encompass motorhomes, campervans, caravans (including travel trailers and camper trailers), fifth-wheel trailers, popup campers and truck campers. When an RV is parked for an extended period of time, such as at a camp site or RV park, stabilizing jacks are typically extended from the RV to help level the RV interior as well as prevent undesired movement or settling of the RV. Typically, jack pads are placed at the jack/ground interface to prevent the jacks from sinking into soft ground, which could make the jacks difficult to later retract as well as slowly deviating the RV interior from level.

Currently, jack pads are typically brightly colored (usually yellow) members made of honeycombed hard plastic. These jack pads are inherently unattractive eyesores when in use and leave equally unattractive checkered patterns in the ground after the RV has retracted its jacks and moved on. Thus, there is a need for more efficient systems for shipping and storing goods. The present novel technology addresses these needs.

BRIEF DESCRIPTION OF THE DRAWINGS

FIG. 1 depicts a top perspective view of a first embodiment of the present novel technology.

FIG. 2 depicts a bottom perspective view of the embodiment of FIG. 1.

FIG. 3 depicts a front end view of the embodiment of FIG. 1.

FIG. 4 depicts a top view of the embodiment of FIG. 1.

FIG. 5 depicts a first side view of the embodiment of FIG. 1.

FIG. 6 depicts a second, reverse side view of the embodiment of FIG. 1.

FIG. 7 depicts a rear end view of the embodiment of FIG. 1.

FIG. 8 depicts a bottom view of the embodiment of FIG. 1.

FIG. 9 depicts a perspective view of a second embodiment of the present novel technology.

FIG. 10 depicts a perspective view of a third embodiment of the present novel technology.

FIG. 11 depicts a perspective view of a fourth embodiment of the present novel technology.

FIG. 12 is a flow chart depicting the method of making animal track souvenirs.

FIG. 13 depicts a perspective view of fifth embodiment of the present novel technology.

FIG. 14 depicts a second perspective view of the fifth embodiment of the present novel technology.

FIG. 15 depicts a sixth embodiment of the present novel technology.

Like reference numbers and designations in the various drawings indicate like elements.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often, though may not always, occur and that the description includes instances where said event or circumstance occurs and instances where it does not.

When a recreational vehicle (RV) is parked, whether for the day or for the season, it is desirable for the RV to be maintained as level as possible. In addition to preventing miscellaneous items from rolling around and or sliding, a level surface helps to keep appliances such as the absorption refrigerator working properly. Once the RV has been made level, it is advantageous to deploy stabilizing jacks to keep the RV level, so as to optimize the efficiency of the appliances, which helps to keep operating costs low as well as limiting undue system wear.

While it is preferred to find a resting spot that is already flat and even, such a lucky find is not always possible. When parked on uneven terrain, RV stabilizing jacks may be deployed to compensate for terrain inequity to both level the vehicle and also maintain the level position, steading the RV.

Stabilizing jacks work more effectively when the surface area of the distal end of the jack is increased via the attachment of a jack foot pads. In addition to preventing the jack from sinking into soft ground and thus losing level over time as well as making the retraction of the jack leg difficult, the foot pad increases the effective surface area of the jack such that ground contact is more even and the jacks are less prone to sliding.

Most foot pads or jack pads are made of a rigid, honeycombed plastic and have a geometric shape, usually square, circular, or hexagonal. The most popular color of these jack pads is bright yellow. While functional, such jack pads are eyesores and leave unnatural crosshatched prints in the ground when the RV moves on.

FIGS. 1-15 depict various perspectives and embodiments of a jack pad 100, typically having a palm portion 105 and a digit portion 110, the digit portion 110 including a plurality of elongated fingers 115 connected to and extending from the palm portion 105.

The palm portion 105 is a generally flat plate having a bottom side 120 and an oppositely disposed top side 125. The top side 125 includes a jack-engaging assembly 130 for engaging a standard circular profile jack head (typically about 10 to about 15 cm. in diameter), a standard square profile jack head (side length typically about 15 cm.), and/or a standard elongated rectangular profile jack head (about 15 cm. by about 23 cm.). Jack engaging assembly 130 includes four spaced ninety-degree angled raised corner members 135 about 0.5 to 1.5 cm. tall and positioned to define the corners of a square of side length of about 17 cm. o.d. (about 16 cm. i.d.). Each corner piece 135 includes two elongated side portions 137 that intersect at a ninety-degree angle, with each side portion 137 extending about 2.5 cm., leaving open sides 139 of length about 12 cm. between any two corner members 135. A square jack foot will snugly engage the corners, while a circular jack foot likewise may engage the ends of each elongated side portion 137, and a rectangular foot may be positioned to extend through two opposing open sides 139 to be engaged by the side members 137. Pads 100 are typically repeatedly removably connected to jacks, but may likewise be permanently affixed thereto as OEM or aftermarket fixtures.

The top side 125 may also include a plurality of raised (or concave) contour features 140 positioned at the base of each finger 115 and/or at the heal of the palm disposed opposite the digit portion 110.

Likewise, the bottom face 120 includes a plurality of contour features 145 for stamping a three-dimensional contoured footprint into soft soil under the weight of the vehicle as transmitted through the stabilizing jacks and over the time the vehicle is parked and stabilized. Typically, the bottom side 120 and top side 125 are contoured to be mirror images of one another, with indentions 151 in the bottom side 120 to snugly or lockingly receive raised corner pieces 135 or at least portions of the wall members 137, such that the pads 100 may nest together and stackingly engage one another for ease of storage. Typically, the foot pad 100 is shaped and contoured to both stabilize the weight distribution of the RV among the plurality of jacks as well as to leave an impression evocative of an animal (real, extinct, or imaginary) footprint or track, such as a bear (see FIGS. 1-8), a wolf (see FIG. 9), a dinosaur (see FIG. 10), a sasquatch (see FIG. 11), a very large bird, or the like.

In some implementations, jack pads 100 are used as part of a method 200 for using an RV to make animal-like tracks. In one implementation, faux animal tracks are made by first extending 205 at least one stabilizing jack from an RV toward soft ground and engaging 210 at least one animal paw shaped jack pad between the at least one jack and the ground. Next, pressing 210 the at least one jack pad into the ground yields at least one animal track print pressed into the ground. Typically, the at least one jack is retracted 215 and the at least one jack pad is retrieved 220 to reveal 225 at least one imprinted animal-like track.

Figure 1:
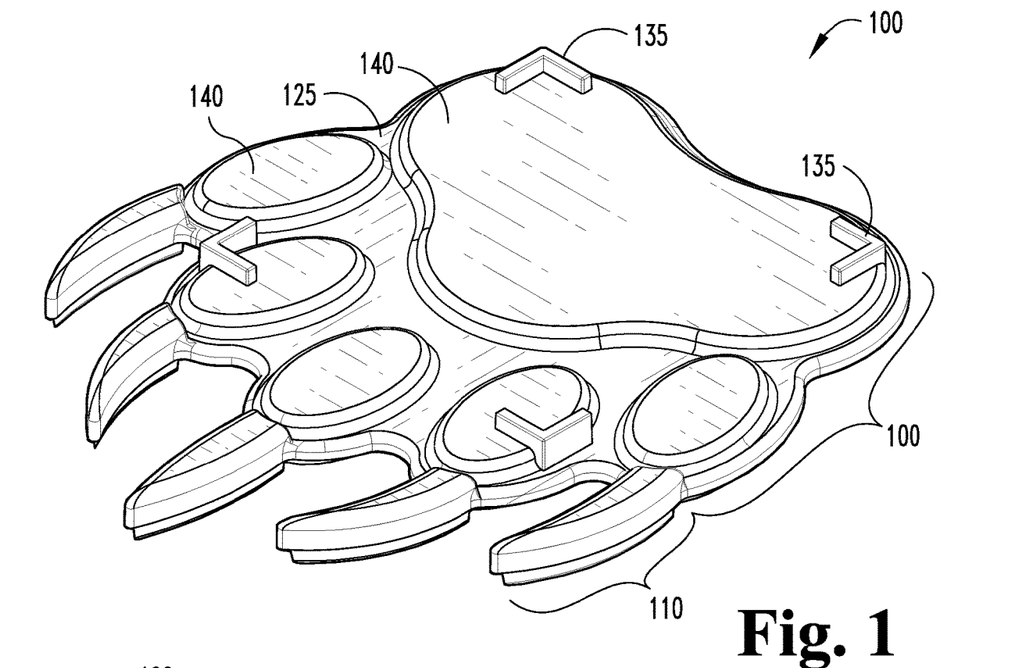
Figure 2:
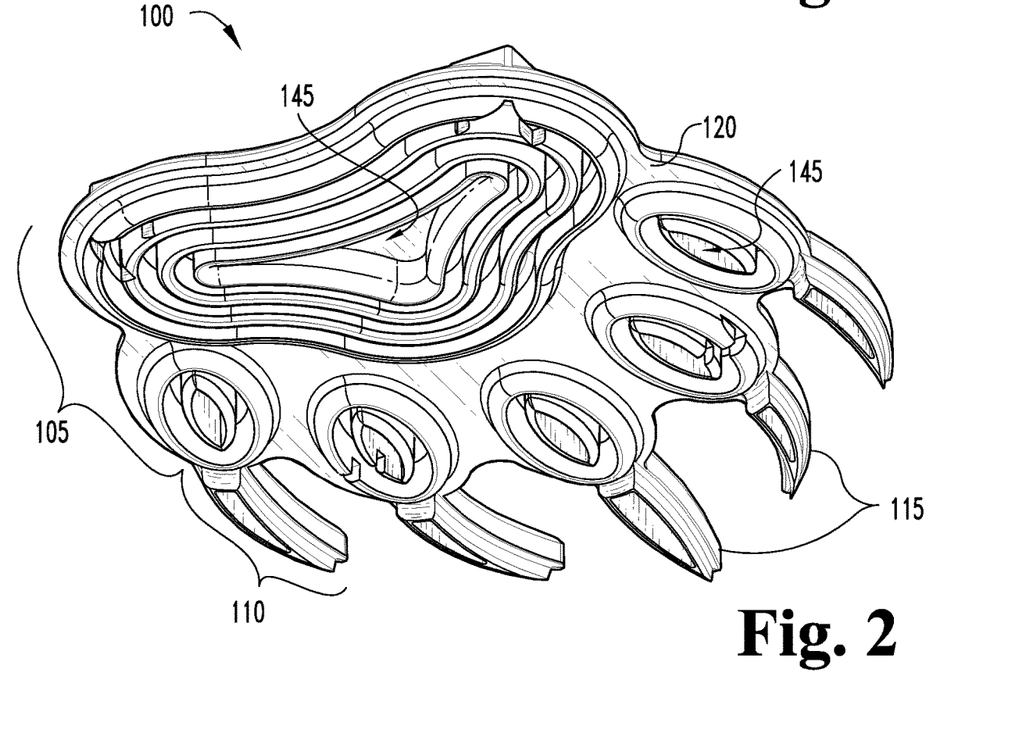
Figure 3:
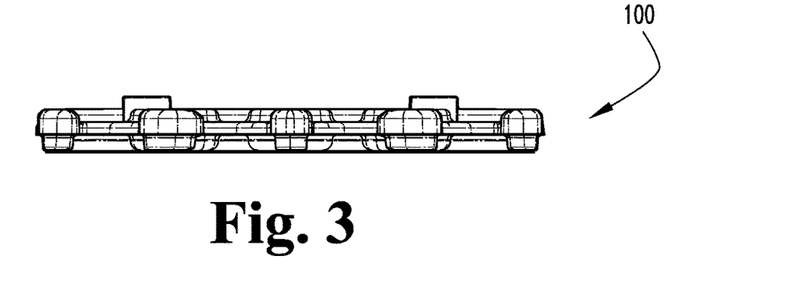
Figures 4, 5, 6:
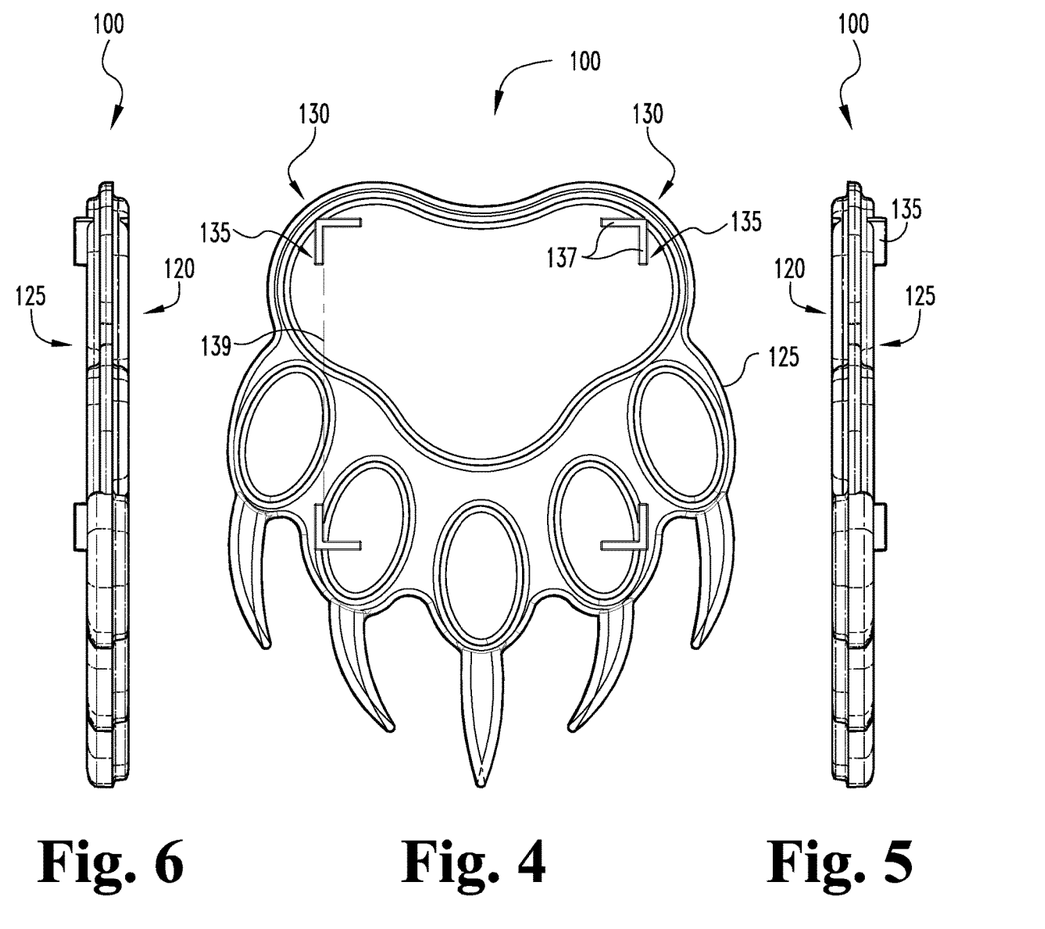
Figure 7:
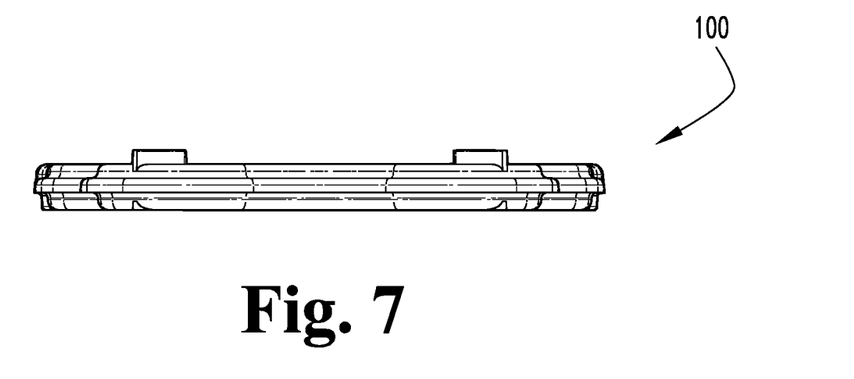
Figure 8:
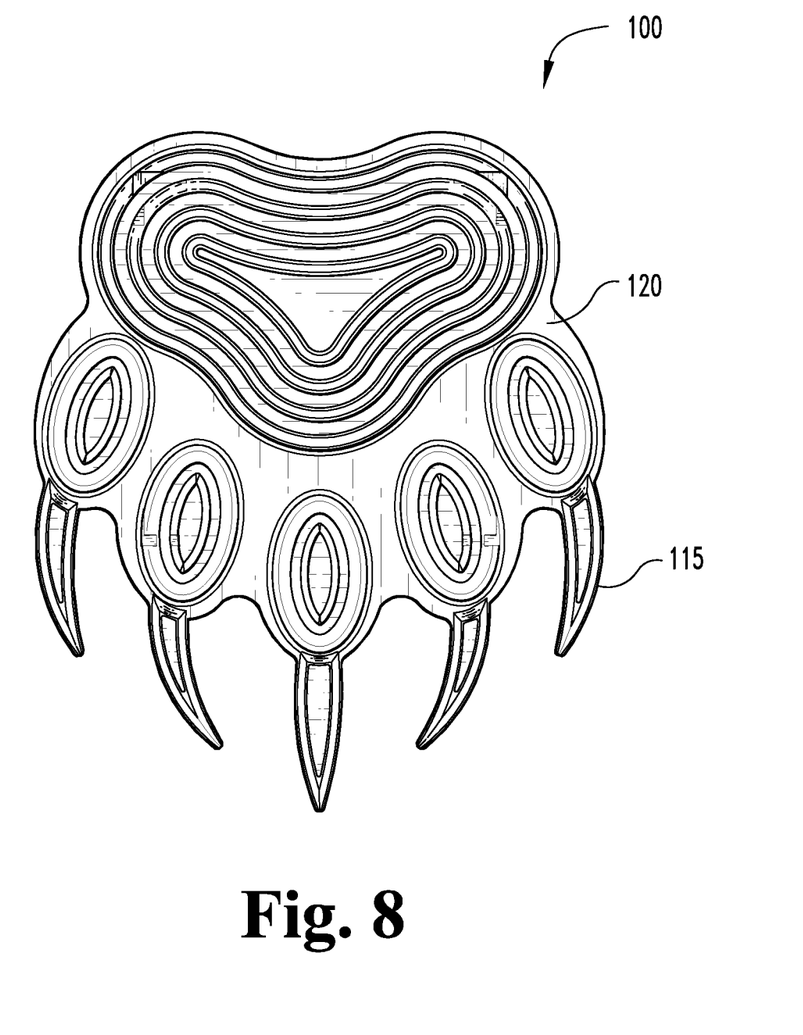
Figure 9:
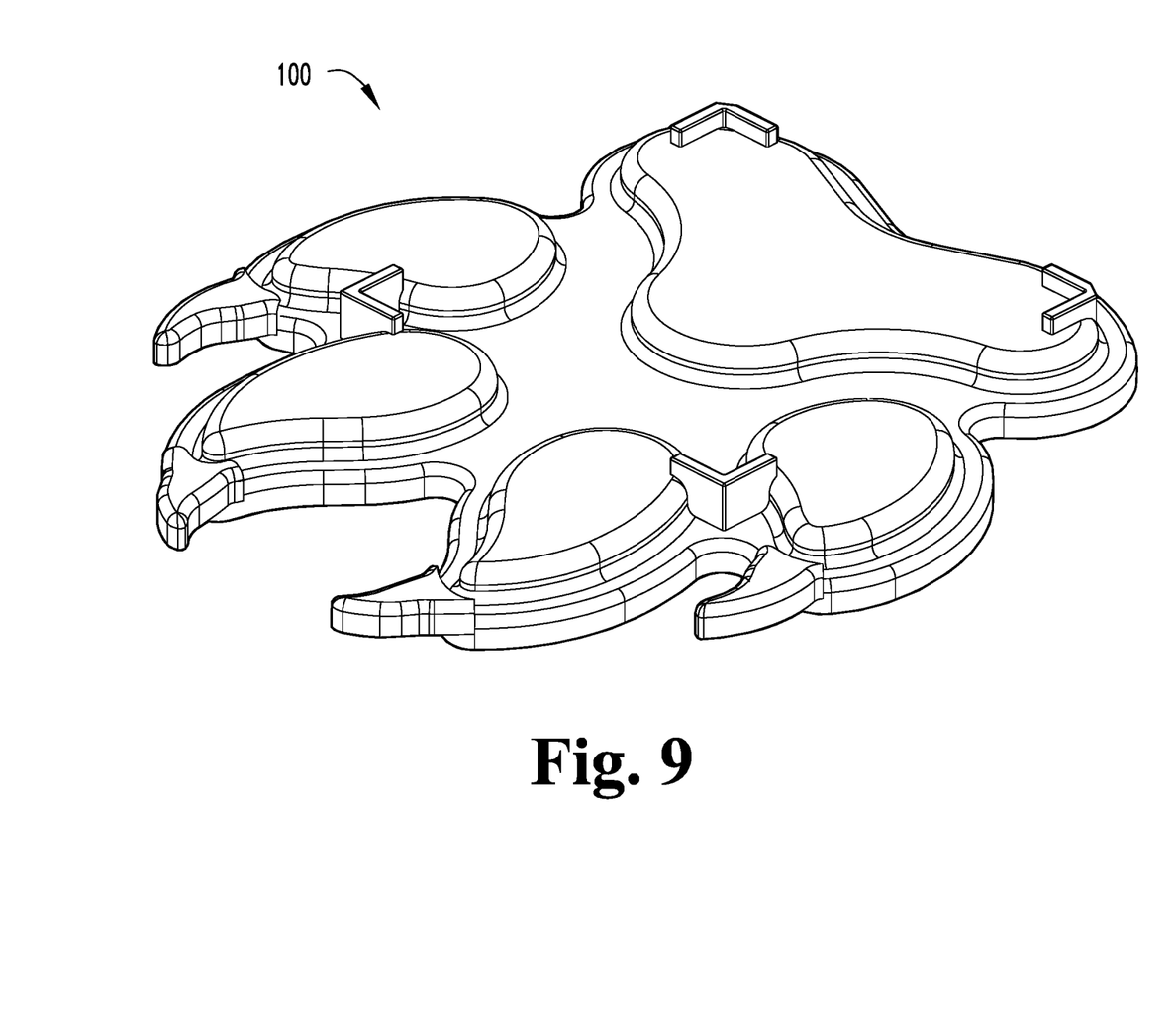
Figure 10:
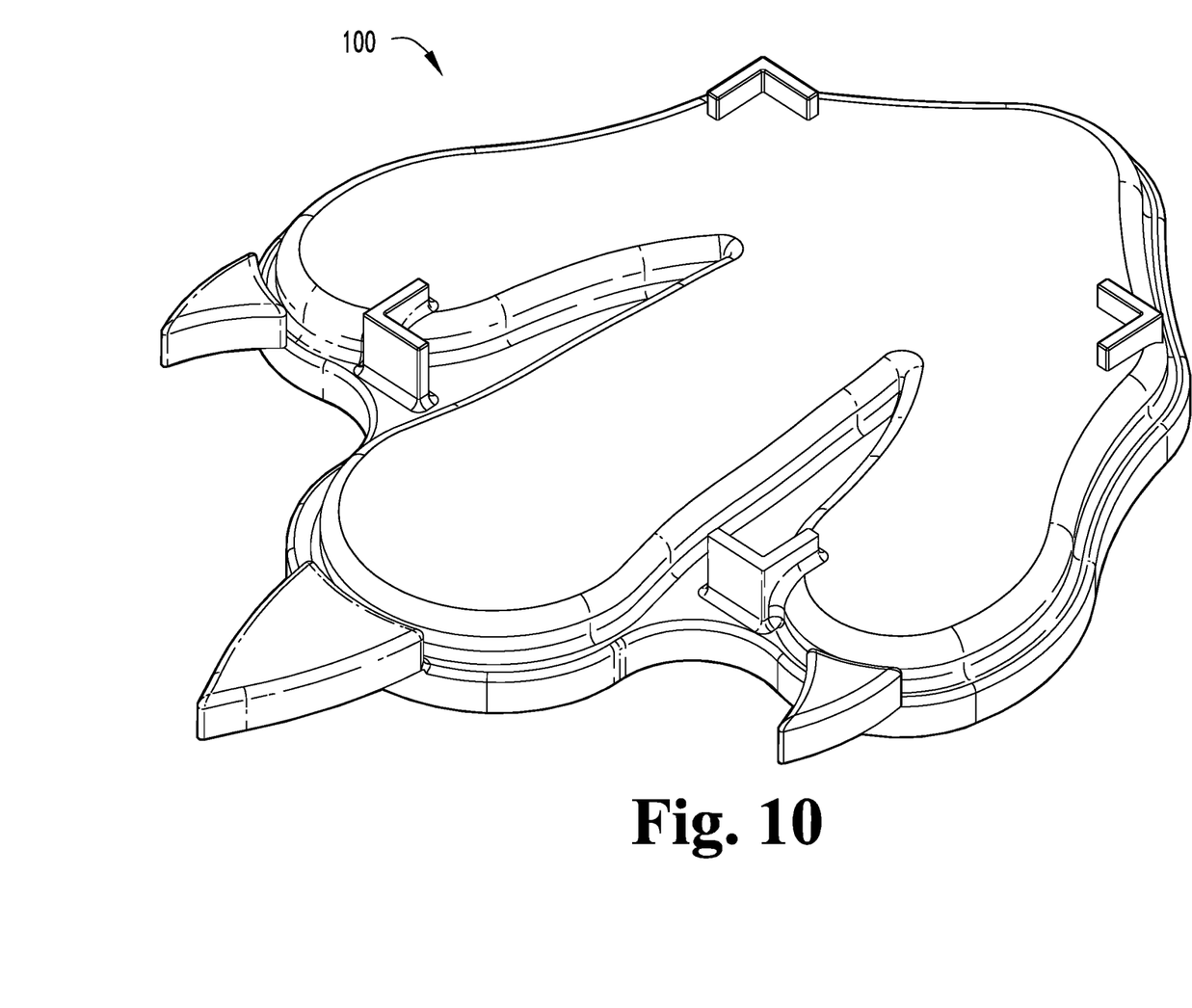
Figure 11:
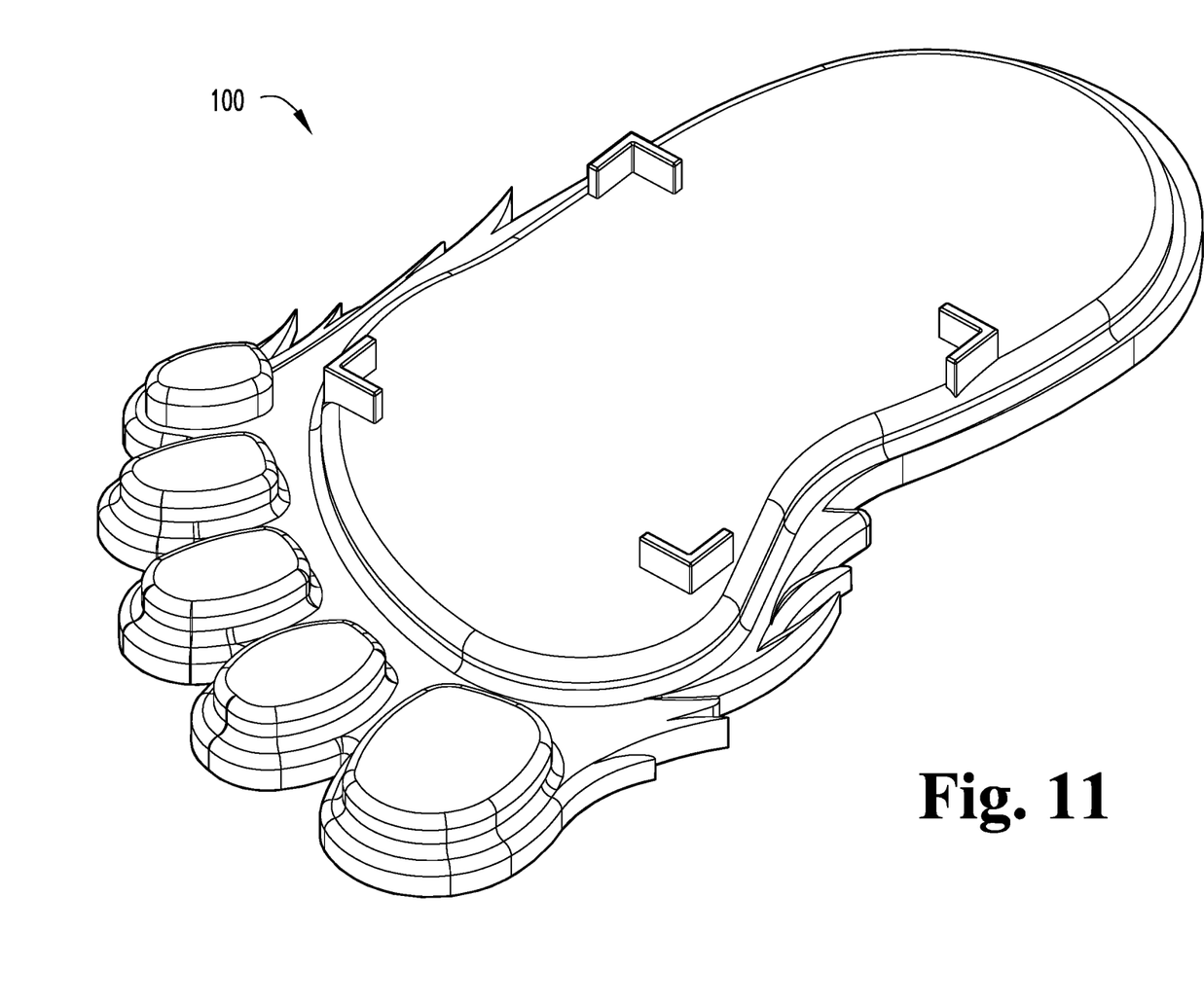
Figure 12:
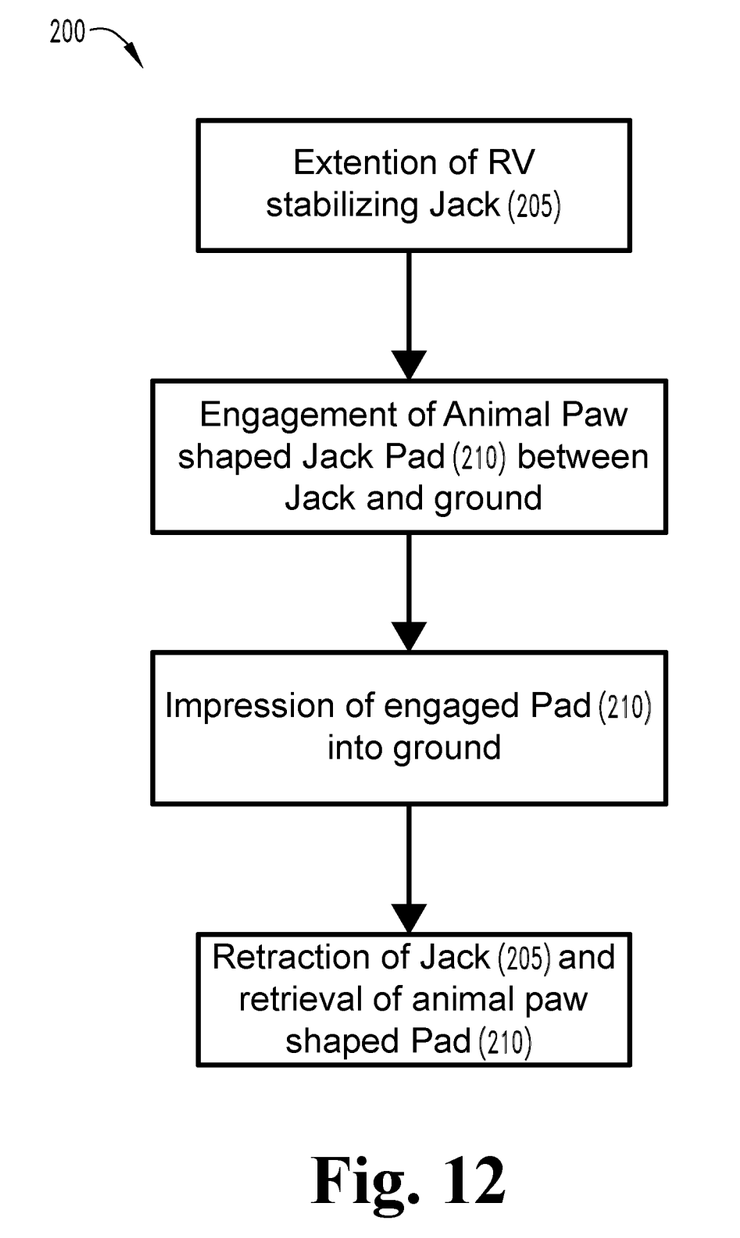
Figure 13:
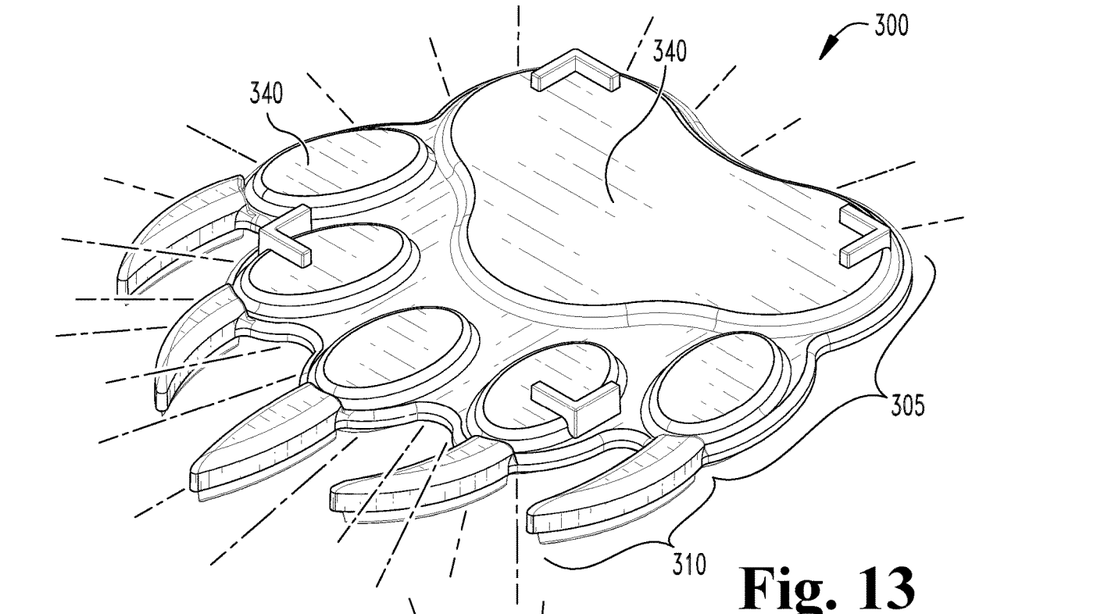
Figure 14:
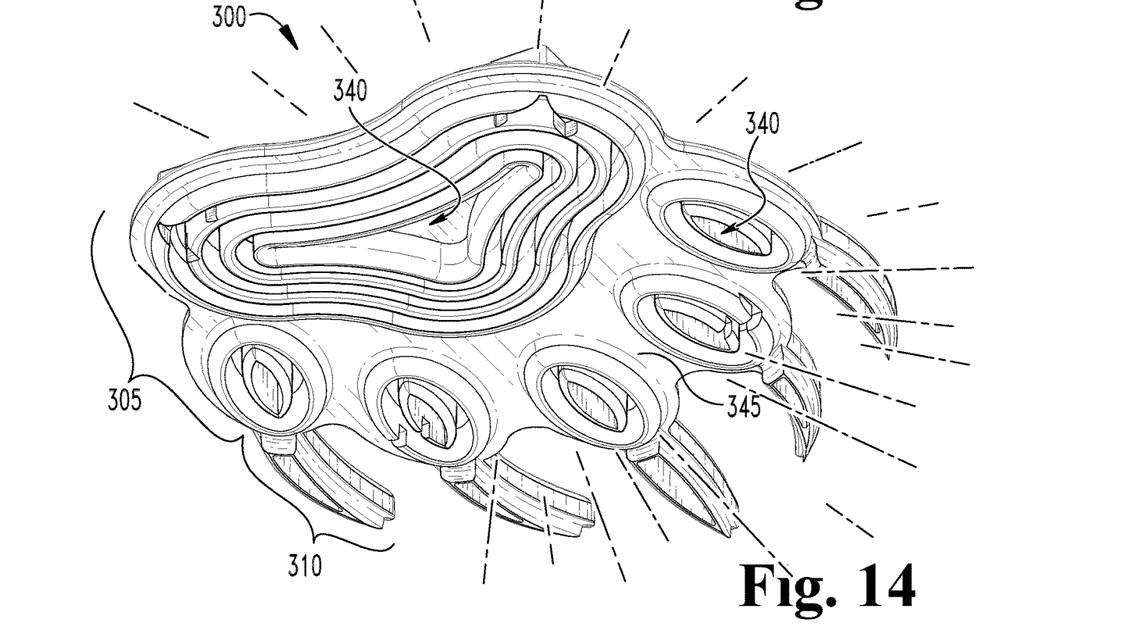

FIGS. 13 and 14 depict a fifth embodiment of the present novel technology, a jack pad 300, typically having a palm portion 305 and a digit portion 310, the digit portion 310 including a plurality of elongated fingers 315 connected to and extending from the palm portion 305 and made of a phosphorescent or 'glow-in-the-dark' structural material, typically a phosphorescent treated plastic material similar to those described above. Typically, the jack pad 300 will absorb ambient light during the day (charging the jack pad 300) and glow for several hours after sunset, allowing campers to more easily locate and identify their RV after dark, especially when parked in locations away from city light pollution and in other particularly dark locations.

The jack pad 300 typically include a phosphorescent additive at concentrations between two and ten weight percent, more typically between four and eight weight percent, and more typically at about six weight percent.

The jack pad 300 may include relatively thick portions 340 and relatively thin portions 345 which will vary the intensity and duration of the light output, with thicker portions glowing brighter and longer. Selective variation of thickness may be employed for artistic and/or practical advantage. Various dyes or colorants may also be added to the composition to vary the color and duration of the glow.

Figure 15:
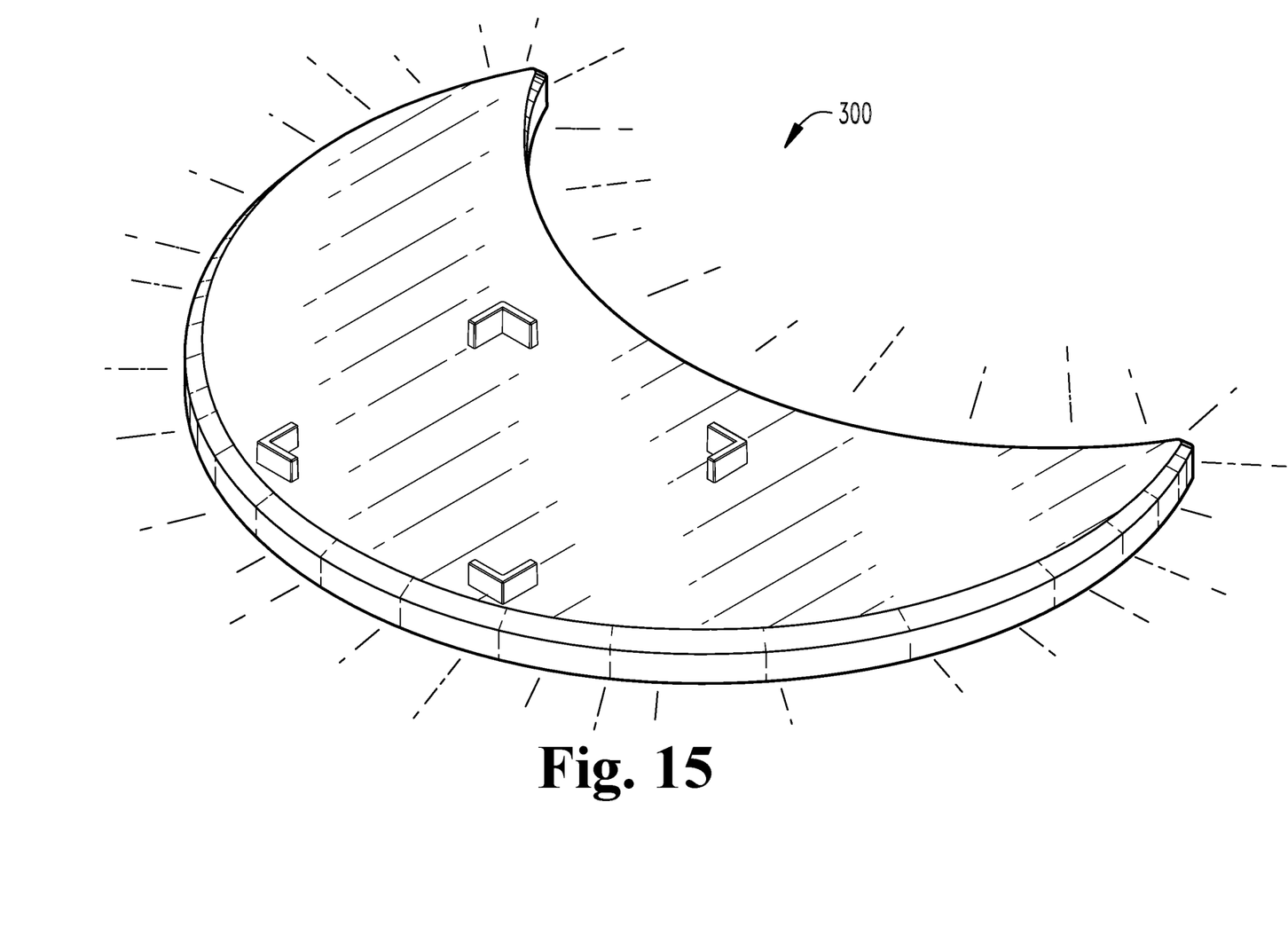

FIG. 15 depict sixth embodiment phosphorescent jack pad 300, similar to the fifth embodiment described immediately above, except that the phosphorescent jack pad 300 has a non-animal print shape, such as that of a star, a half moon, or any convenient shape.

Any of the above embodiments may be sized larger to accommodate an extra-large RV, class-A RV's, or the like, or smaller to accommodate RV stairs or a motorcycle or like vehicle.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some instances be excised from the combination, and the claimed combination may be directed to a subcombination or variation of a subcombination.

Thus, particular embodiments of the subject matter have been described. Nigh-infinite other embodiments are within the scope of the following claims. In some instances, the actions recited in the claims may be performed in a different order and still achieve desirable results. In addition, the processes depicted in the accompanying figures do not necessarily require the particular order shown, or sequential order, to achieve desirable results.

What is claimed is:

1. A reusable vehicular phosphorescent jack pad system, comprising:
    a plurality of phosphorescent jack pads, each respective pad further comprising:
        a phosphorescent top face;
        an oppositely disposed bottom face;
        a jack-engaging assembly operationally connected to the phosphorescent top face;
        a palm portion; and
        a toe portion extending from the palm portion;
    wherein each respective jack pad is shaped like an animal paw;

wherein each respective bottom face is contoured to leave a paw print in soft ground; and wherein each respective top face is contoured to stackingly engage a respective bottom face.

2. The system of claim 1, wherein the toe portion defines a plurality of fingers extending from the palm portion.

3. The system of claim 1, wherein the jack-engaging assembly further comprises four raised corner members disposed on the top face and on the palm portion and spaced to define a square; wherein each side of the square is about 17 cm. long; wherein each side of the square includes a distance of about 12 cm. between two respective corner members.

4. The system of claim 1, wherein the respective phosphorescent jack pads are shaped like bear paws.

5. The system of claim 1, wherein the respective phosphorescent jack pads are shaped like dog paws.

6. The system of claim 1, wherein the respective phosphorescent jack pads are shaped like sasquatch feet.

7. A phosphorescent pad system for engaging vehicular stabilizers, comprising:
a plurality of phosphorescent jack pads, each respective pad further comprising:
a phosphorescent top face;
an oppositely disposed bottom face; and
a jack-engaging assembly operationally connected to the phosphorescent top face;
wherein each respective top face is contoured to stackingly engage a respective bottom face.

8. The phosphorescent pad system of claim 7 wherein the jack-engaging assembly further comprises four raised corner members disposed on the top face and on the palm portion and spaced to define a square; wherein each side of the square is about 17 cm. long; wherein each side of the square includes a distance of about 12 cm. between two respective corner members.

9. The phosphorescent pad system of claim 7 and further comprising:
a palm portion; and
a toe portion extending from the palm portion;
wherein each respective jack pad is shaped like an animal paw; and
wherein each respective bottom face is contoured to leave a paw print in soft ground.

10. The phosphorescent pad system of claim 7, wherein the respective phosphorescent jack pads are shaped like bear paws.

11. The phosphorescent pad system of claim 7, wherein the respective phosphorescent jack pads are shaped like dog paws.

* * * * *